US011216234B2

(12) United States Patent
Zheng et al.

(10) Patent No.: US 11,216,234 B2
(45) Date of Patent: Jan. 4, 2022

(54) METHOD FOR SYNCHRONOUSLY ADJUSTING SCREEN SETTINGS AND RELATED DEVICE

(71) Applicant: Wistron Corporation, New Taipei (TW)

(72) Inventors: Lifan Zheng, New Taipei (TW); Yongqiang Li, New Taipei (TW); JunXin Qiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/679,248

(22) Filed: Nov. 10, 2019

(65) Prior Publication Data
US 2020/0409644 A1 Dec. 31, 2020

(30) Foreign Application Priority Data

Jun. 28, 2019 (CN) .......................... 201910575333.X

(51) Int. Cl.
*G06F 3/14* (2006.01)
(52) U.S. Cl.
CPC .................................. *G06F 3/1423* (2013.01)
(58) Field of Classification Search
CPC .................................. G06F 3/1423; G06F 3/14
See application file for complete search history.

(56) References Cited

U.S. PATENT DOCUMENTS

| 6,570,546 | B1 * | 5/2003 | Welker | G06F 3/1446 |
| | | | | 345/1.1 |
| 2009/0182917 | A1 * | 7/2009 | Kim | G06F 3/1438 |
| | | | | 710/106 |
| 2014/0029503 | A1 | 1/2014 | Kambhatla | |
| 2014/0101576 | A1 | 4/2014 | Kwak | |
| 2015/0363154 | A1 * | 12/2015 | Frederick | G06F 3/1423 |
| | | | | 345/1.3 |

FOREIGN PATENT DOCUMENTS

CN 106547509 A 3/2017

OTHER PUBLICATIONS

Alan Kobayashi, DisplayPort Ver.1.2 Overview, DisplayPort Developer Conference, Westin Taipei (download from http://www.vesa.org/wp-content/uploads/2010/12/DisplayPort-DevCon-Presentation-DP-1.2-Dec-2010-rev-2b.pdf) Published on Dec. 6, 2010.

* cited by examiner

*Primary Examiner* — Kenneth B Lee, Jr.
(74) *Attorney, Agent, or Firm* — Winston Hsu

(57) ABSTRACT

A method for synchronously adjusting a screen setting for a multi-screen system, wherein the multi-screen system supports a daisy chain tech, the method comprising: via a first physical link between an electronic device and a first screen of the multi-screen system, writing a first DPCD including a screen setting in a first display port address of the first screen, and via a second physical link between the first screen and a second screen, writing a second DPCD including the screen setting in a second display port address of the second screen.

18 Claims, 7 Drawing Sheets

| DPCD | Function | Explanation |
|---|---|---|
| 0x60000 | Length | valid operation command length (not including length and CHK) |
| 0x60001 | OP | operation code |
| 0x60002 | CMD | command code |
| 0x60003 | Value H | command value (high bit) |
| 0x60004 | Value L | command value (lower bit) |
| 0x60005 | CHK | check code (not including length and CHK) 0xff-checksum |

FIG. 4

| DPCD | Function | Explanation |
|---|---|---|
| 0x60010h | Brightness adjustment | range of 0~64h, corresponding to brightness percentage of "0~100" |

FIG. 6

METHOD FOR SYNCHRONOUSLY ADJUSTING SCREEN SETTINGS AND RELATED DEVICE

BACKGROUND OF THE INVENTION

1. Field of the Invention

The present invention relates to a method of synchronously adjusting screen setting, and more particularly, to a method of writing the screen setting into DPCD through a physical channel between screens and related device.

2. Description of the Prior Art

Since a single large screen is expensive and difficult to handle and install, the daisy chain serial connection technology based on the display interface standard (hereafter called display port (DP)) is used to connecting multiple screens when the user has display requirement in a large screen, to implement the large screen display. The DP standard is an agreement issued by the Video Electronics Standards Association (VESA). The data transmission between the source device and the terminal device supporting the DP standard can be operated in the Multi-Stream Transport (MST) mode or the Clone mode.

For screens operated in the MST mode, when the computer device outputs a display image to the second screen, the image data is transmitted to the second screen through the first screen. That is, the first screen can be regarded as a data transmission channel, for directly transferring the display image to the second screen. Similarly, the image data from the computer device to the third screen is also skipped by the first screen and the second screen, and is directly transmitted to the third screen, so screens of the MST mode can display different images. In comparison, the screen operated in Clone mode stores the image data outputted from the computer device and then transmit the image data to the next screen, so screens of the Clone mode display the same image.

However, with the conventional DP standard, the user needs to set every screen (e.g. adjusting brightness, contrast, color temperature, response speed (i.e. Overdrive, OD)) when the user needs to adjust the screens on the connection. This setting method is a very cumbersome task and easy to miss or incorrectly adjust the settings of a screen, resulting in different screen configurations and inconsistent screen displaying.

SUMMARY OF THE INVENTION

It is therefore an objective to provide a method for synchronously adjusting a screen setting and related device to solve the above problem.

The present invention discloses a method for synchronously adjusting a screen setting for a multi-screen system supporting a daisy chain tech. The method comprises via a first physical link between an electronic device and a first screen of the multi-screen system, writing a first display port configuration data, DPCD, including a screen setting in a first display port address of the first screen, and via a second physical link between the first screen and a second screen of multi-screen system, writing a second DPCD including the screen setting in a second display port address of the second screen, wherein the first and second screens read the first and second DPCDs mapped to the first and second display port addresses, to adjust screen configurations of the first and second screens according to the first and second DPCD.

The present invention further discloses a multi-screen system for synchronously adjusting a screen setting. The multi-screen system comprises a plurality of screens, connecting to each other by a daisy chain tech, wherein the plurality of screens includes a first screen and a second screen, the first screen comprising a first display port transmission unit and a first display port reception unit, and the second screen comprising a second display port transmission unit and a second display port reception unit, wherein the first display port reception unit of the first screen is used for receiving a screen setting, and the first display port transmission unit is used for writing the screen setting in a display port configuration data, DPCD, mapped to a second display port address of the second screen via a physical channel, whereby the second screen reads the second DPCD mapped to the second display port address, to adjust a screen configuration according to the screen setting in the second DPCD.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a screen setting mapped to a display port address according to an embodiment of the present disclosure.

FIG. 6 is a schematic diagram of a screen setting mapped to a display port address according to an embodiment of the present disclosure.

DETAILED DESCRIPTION

Figure 1:
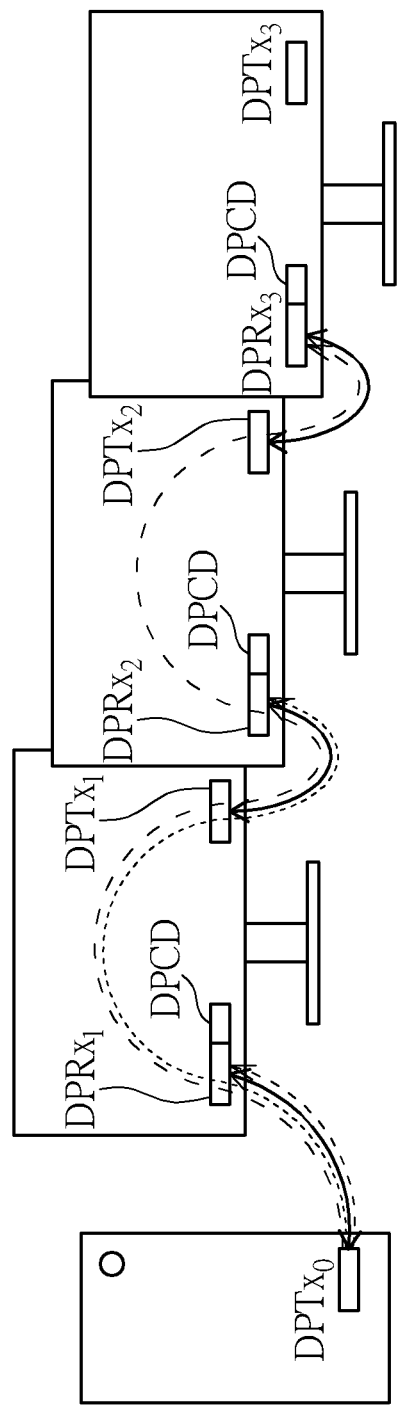
FIG. 1 is a schematic diagram of a multi-screen system according to an embodiment of the present disclosure.

FIG. 1 is a schematic diagram of a multi-screen system according to an embodiment of the present disclosure. The multi-screen system supports the DP standard, where screens are connected to each other with daisy chain technique. Note that, the screen number of the multi-screen system is not limited herein. Each screen includes an input terminal DP Rx, an output terminal DP Tx, and a display port address for storing display port configuration data (DPCD). In FIG. 1, the input terminal DP $Rx_1$ of the first screen is connected to the output terminal of the computer device DP $Tx_0$, the output terminal of the first screen DP $Tx_1$ is connected to the input terminal of the second screen DP $Rx_2$, the output terminal DP $Tx_2$ of the second screen is connected to the input terminal DP $Rx_3$ of the third screen, and so on.

The transmission layer architecture between the screens includes a main channel and an AUX channel, wherein the main channel is used for image data transmission (which can be Multi-Stream Transport, MST, mode or Clone mode), and the AUX channel is used for reading extended display capability identify information and DPCD. For example, the input terminal DP $Rx_1$ of the first screen (such as the receiving end) receives the image data outputted from the output terminal DP $Tx_0$ of the host computer (such as the source end) through the main channel, the output terminal DP $Tx_1$ transmits the image data to the input terminal DP $Rx_2$ through the main channel, and finally the output terminal DP $Tx_2$ transmits the image data to the input terminal DP $Rx_3$ through the main channel. Note that, the screen includes a data structure named DPCD for storing the screen setting, which can be read and written for both of the receiving end and the source end. That is, the receiving end and the source end can read or write the screen setting based on the DPCD mapped to the display port address. In a word, DPCD is used for providing information about the screen setting for adjusting the configuration of the screen.

In addition, the AUX channel can be used to transmit a sideband message, wherein the sideband message indicates a screen number and a relative address (RAD) in the multi-screen system. Therefore, each screen knows how many screens in the multi-screen system, and knows whether it is connected to other screens according to the RAD. For example, in the case where the multi-screen system includes three screens, the first screen obtains its relative address RAD0 with information carried by the sideband message. Similarly, the second screen obtains its relative address RAD 0.1, and the third screen obtains its relative address RAD 0.1.1, such that each screen can determine whether it is connected to other screens.

The present invention is used for automatically adjusting all screens of the multi-screen system to the same configuration after setting one screen on the daisy chain. The screen setting is not limited to brightness, contrast, color temperature, on/off status adjustment, so that the user can adjust the configuration of every screen of the multi-screen system by adjusting only one screen.

Figure 2:
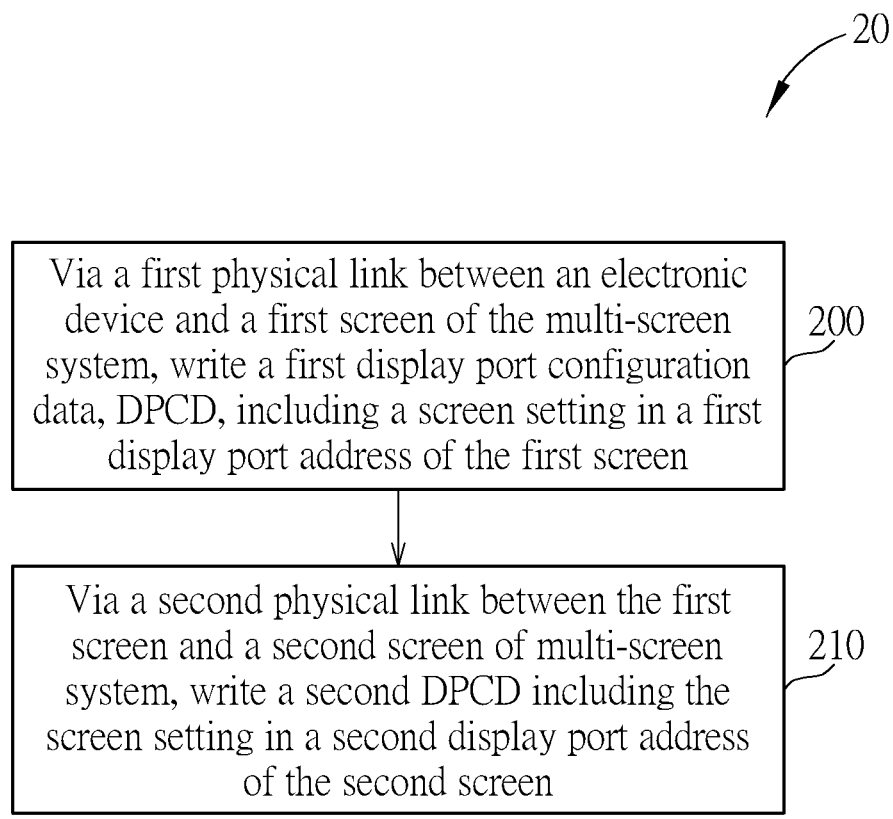
FIG. 2 is a flowchart of a screen adjustment process according to an embodiment of the present disclosure.

The multi-screen system is operated in the MST mode, but is not limited herein. In other embodiments, the multi-screen system could be operated in the Clone mode. Reference is made to FIG. 2. A flowchart of screen adjustment process 20 is illustrated, and may include the following steps:

Step 200: Via a first physical link between an electronic device and a first screen of the multi-screen system, write a first display port configuration data, DPCD, including a screen setting in a first display port address of the first screen.

Step 210: Via a second physical link between the first screen and a second screen of multi-screen system, write a second DPCD including the screen setting in a second display port address of the second screen.

According to the screen adjustment process 20, the first screen/second screen reads the first DPCD/second DPCD mapped to the first display port address/second display port address, to adjust the screen configuration based on the screen setting in the first DPCD/second DPCD. In short, by sequentially writing the screen setting to the display port address of each screen (e.g. the address space reserved in the screen), every screen can be adjusted to the same configuration and complied with the same screen setting. In an embodiment, the abovementioned electronic device may be a computer host or a screen of the multi-screen system. Besides, the abovementioned physical channel may be the AUX channel.

Figure 3:
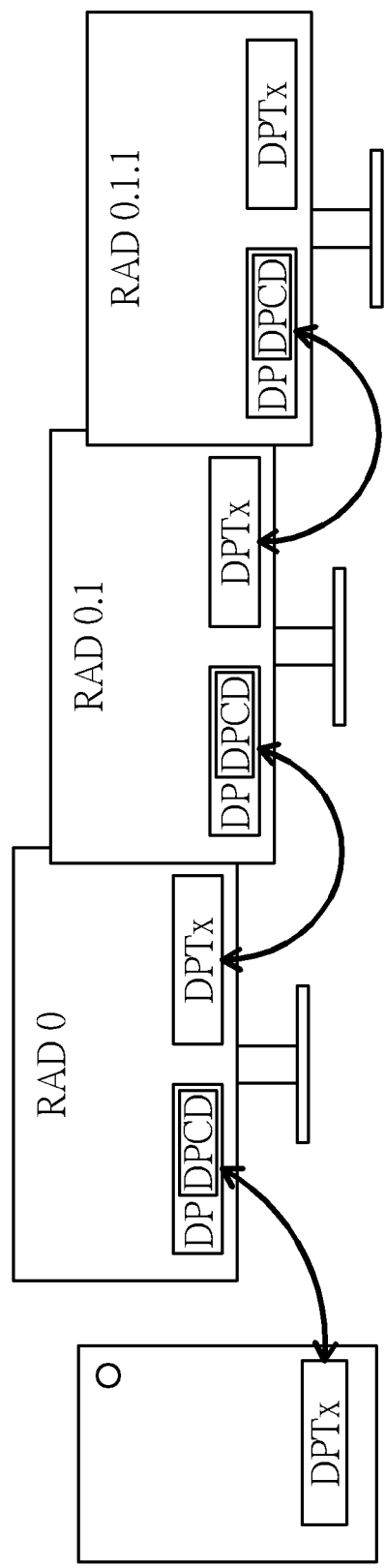
FIG. 3 is a schematic diagram of a multi-screen operation according to an embodiment of the present disclosure.

FIG. 3 is a schematic diagram of a multi-screen operation according to an embodiment of the present disclosure. In FIG. 3, the screen RAD 0.1 is controlled by the adjusted screen RAD 0, and then the screen RAD 0.1 controls the screen RAD 0.1.1 to achieve uniform adjustment of the screen setting (e.g. brightness, contrast, boot, etc.). For example, the user adjusts the brightness of the screen RAD 0 via the computer. In other words, the computer writes the screen setting (such as the brightness configuration) to the DPCD of the screen RAD 0 through the physical channel (e.g. the AUX channel), so the screen RAD 0 is adjusted based on the brightness configuration. In addition, the screen RAD 0 determines whether it is connected to the screen RAD 0.1. If the screen RAD 0 determines that it is connected to the screen RAD 0.1, the screen RAD 0 sets the DPCD of the screen RAD 0.1, namely the brightness configuration is written into the DPCD of the screen RAD 0.1. After the screen RAD 0.1 receives the DPCD containing the brightness configuration, the screen RAD 0.1 determines whether it is connected the screen RAD 0.1.1. If the screen RAD 0.1 is connected to the screen RAD 0.1.1, the screen RAD 0.1 writes the brightness configuration into the DPCD of the screen RAD 0.1.1.

In an embodiment, the display port address (e.g. the address space 02010h~67FFFh and 69000h~6FFFFh in the VESA protocol specification) is reserved for the designer to use, for example, to reserve the address space for storing the DPCD. For example, the display port address 60000h~60005h is used in this case, but it is not limited herein. In FIG. 4, display port address 0x60000~0x60005 is reserved for the screen setting operation. The write operation of the screen setting (e.g. brightness configuration) can be realized by command method or register method. The DPCD can be a screen configuration parameter or a predetermined screen configuration format. Taking the predetermined screen configuration format as an example, display port address 0x60000 is reserved as the valid operation command length, display port address 0x60001 is used as the operation code (e.g. read/write), display port address 0x60002 is used as the command code (e.g. brightness adjustment), display port address 0x60003 is used as the command value (e.g. high bit), display port address 0x60004 is used as the command value (e.g. lower bit) and display port address 0x60005 is reserved as the check code. For example, the operation code represents "write" when the value 0x01 is written into DPCD mapped to display port address 0x60001 is. e and the command code represents "brightness" when the value 0x01 is written into DPCD mapped to display port address 0x60002.

Figure 5:
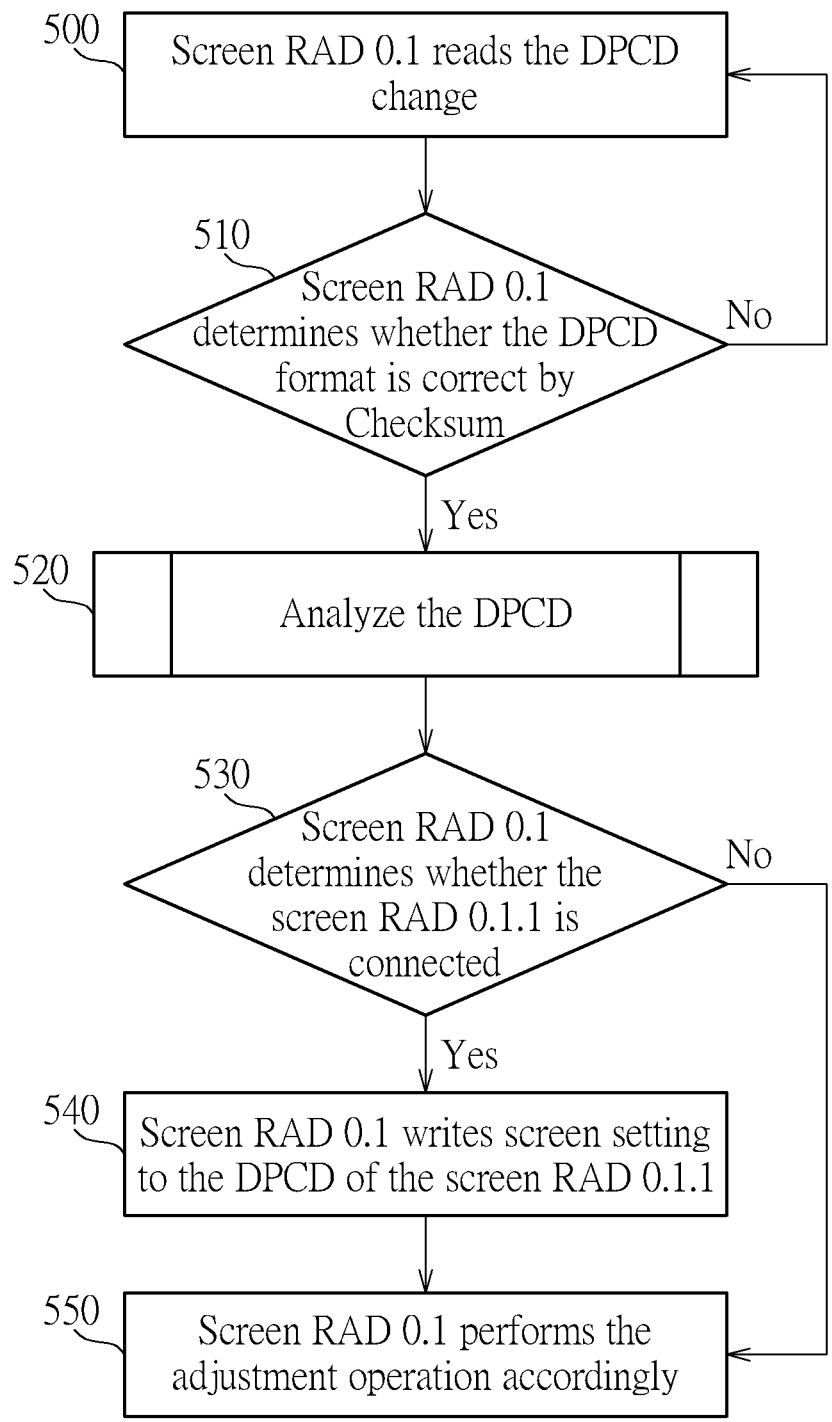
FIG. 5 is a schematic diagram of a brightness adjustment process according to an embodiment of the present disclosure.

FIG. 5 is a schematic diagram of a brightness adjustment process according to an embodiment of the present disclosure. When the screen RAD 0.1 reads the DPCD change (e.g. display port address 0x60000~0x60005=04h 01h 10h 00h 32h Bch) (step 500), the screen RAD 0.1 determines whether the DPCD format is correct (step 510), such as reading Checksum (checksum=Bch) mapped to the display port address 0x60005. If the format is correct, the screen RAD 0.1 analyzes the DPCD, and therefore obtains that 0x60000h=04h represents the length, 0x60001h=01h represents write operation, 0x60002h=10h represents brightness command, 0x60003h=00 represents high bit, 0x60004h=32h represents lower bit, that is, 32h is transformed to decimal value "50" (step 520). Next, the screen RAD 0.1 determines whether the screen RAD 0.1.1 is connected (step 530), and if so, the screen setting "04h 01h 10h 00h 32h Bch" is written to the DPCD of the screen RAD 0.1.1 (step 540). On the other hand, if the screen RAD 0.1.1 is not connected, the screen RAD 0.1 performs the adjustment operation corresponding to the screen setting (namely the brightness configuration is set to "50").

Figure 7:
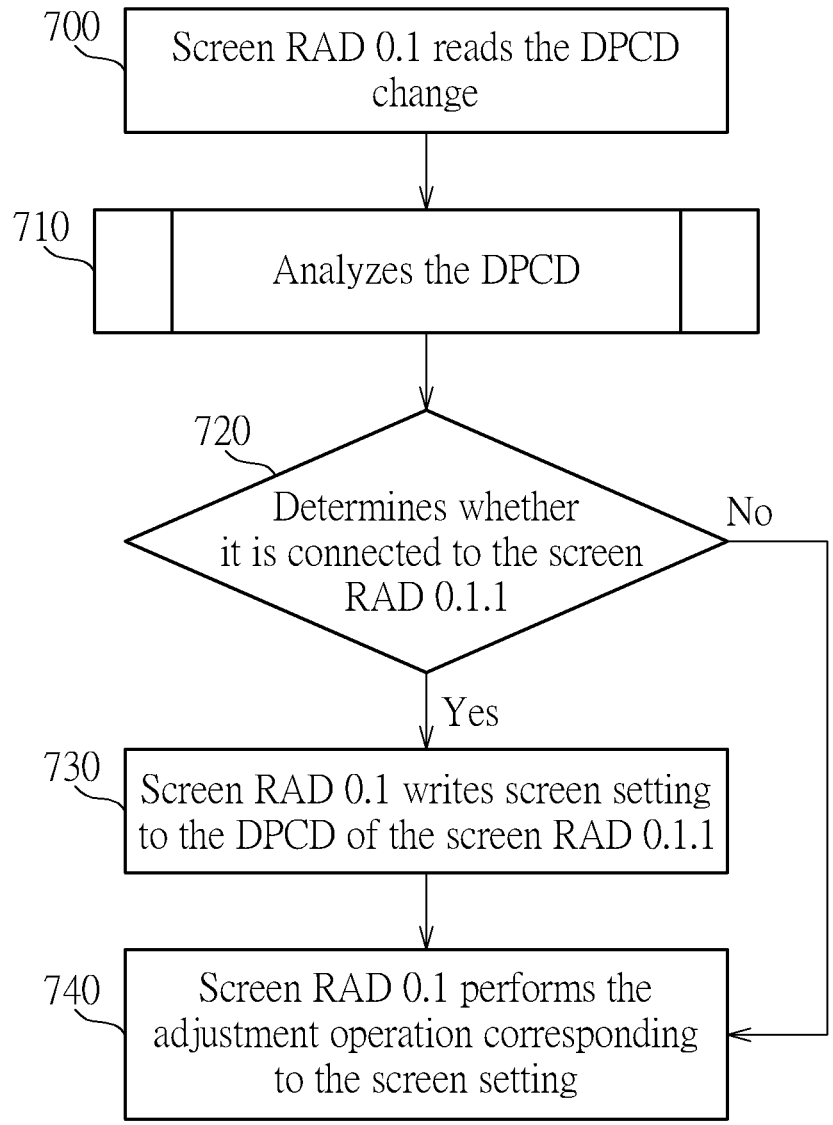
FIG. 7 is a schematic diagram of a brightness adjustment process according to an embodiment of the present disclosure.

On the other hand, the display port address is configured as the screen configuration parameter. The display port address 0x6 0010h is preset to brightness adjustment, and thus the screen will adjust its configuration directly according to the brightness value when the display port address 0x60010h is written with the range of "0~64h", which means the brightness percentage of "0~100". FIG. 7 is a schematic diagram of a brightness adjustment process according to an embodiment of the present disclosure. The screen RAD 0.1 reads the DPCD change (display port address 0x60010=32h) (step 700), and analyzes the DPCD to obtain the screen setting as the brightness to be adjusted to "50" (namely "32h" transferred to decimal value "50") (step 710). Then, the screen RAD 0.1 determines whether it is connected to the screen RAD 0.1.1 (step 720). If so, the screen setting is written to the DPCD (0x60010=32h) of the screen RAD 0.1.1 (step 730); if not, the screen RAD 0.1 performs the brightness adjustment corresponding to the screen setting.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the multi-screen system.

In conclusion, the present invention provides a method for synchronously adjusting the screen configuration. In detail, the screens write DPCD including the screen setting with the reserved display port address, and thus the one screen setting could be written into the next screen, so every screen is configured with the same settings.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronously adjusting a screen setting for a multi-screen system supporting a daisy chain tech, the method comprising:
via a first physical link between an electronic device and a first screen of the multi-screen system, writing a first display port configuration data, DPCD, including a screen setting in a first display port address of the first screen; and
via a second physical link between the first screen and a second screen of multi-screen system, writing a second DPCD including the screen setting in a second display port address of the second screen;
wherein the first and second screens read the first and second DPCDs mapped to the first and second display port addresses, to adjust screen configurations of the first and second screens according to the first and second DPCDs;
wherein the first and second DPCDs are read and written via the first and second physical links;
wherein the electronic device is a screen of the multi-screen system.

2. The method of claim 1, wherein the first physical link or the second physical link includes an auxiliary channel (AUX channel).

3. The method of claim 1, wherein the screen setting includes at least one of a brightness, a contrast, a color temperature and a turning on/turning off.

4. The method of claim 1, wherein the multi-screen system is operated in a Multi-Stream Transport, MST, mode or a Clone mode.

5. The method of claim 2, further comprising:
obtaining a relative address, RAD, of the first screen or the second screen and a screen number in the multi-screen system via a sideband message data header transmitted on the AUX channel.

6. The method of claim 5, further comprising:
determining whether the first screen is connected to the second screen according to the RAD of the first screen and the screen number;
wherein the step of via the second physical link between the first screen and the second screen of multi-screen system, writing the second DPCD including the screen setting in the second display port address of the second screen comprises:
writing the second DPCD including the screen setting in the second display port address when the first screen is connected to the second screen.

7. The method of claim 1, wherein the first DPCD or the second DPCD of the first display port address or the second display port address includes a screen configuration parameter or a predetermined screen configuration format.

8. The method of claim 7, further comprising:
determining whether the screen setting of the first DPCD is conformed to the predetermined screen configuration format;
wherein the step of via the second physical link between the first screen and the second screen of multi-screen system, writing the second DPCD including the screen setting in the second display port address of the second screen comprises:
writing the second DPCD including the screen setting in the second display port address when the screen setting is conformed to the predetermined screen configuration format.

9. A multi-screen system for synchronously adjusting a screen setting, the multi-screen system comprising:
a plurality of screens, connecting to each other by a daisy chain tech, wherein the plurality of screens includes a first screen and a second screen;
the first screen comprising a first display port transmission unit and a first display port reception unit; and
the second screen comprising a second display port transmission unit and a second display port reception unit;
wherein the first display port reception unit of the first screen is used for receiving a first display port configuration data, DPCD, including a screen setting via a first physical link, and the first display port transmission unit is used for writing the screen setting in a second display port configuration data, DPCD, mapped to a second display port address of the second screen via a second physical link;
whereby the second screen reads the second DPCD mapped to the second display port address, to adjust a screen configuration according to the screen setting in the second DPCD;
wherein the first and the second DPCDs are read and written via the first and the second physical links;

wherein the screen setting is received from a screen of the multi-screen system.

10. The multi-screen system of claim 9, wherein the first physical link or the second physical link includes an auxiliary channel (AUX channel).

11. The multi-screen system of claim 9, wherein the screen setting includes at least one of a brightness, a contrast, a color temperature and a turning on/turning off.

12. The multi-screen system of claim 9, wherein the multi-screen system is operated in a Multi-Stream Transport, MST, mode or a Clone mode.

13. The multi-screen system of claim 10, wherein the first screen or the second screen obtains a relative address, RAD, of the first screen or the second screen and a screen number in the multi-screen system via a sideband message data header transmitted on the AUX channel.

14. The multi-screen system of claim 13, wherein the first screen determines whether the first screen is connected to the second screen according to the RAD and the screen number, and writes the screen setting in the second display port address when the first screen is connected to the second screen.

15. The multi-screen system of claim 9, wherein the first DPCD or the second DPCD of the first display port address or the second display port address includes a screen configuration parameter or a predetermined screen configuration format.

16. The multi-screen system of claim 15, wherein the first screen determines whether the screen setting of the first DPCD is conformed to the predetermined screen configuration format, and writes screen setting in the second display port address of the second screen when the screen setting is conformed to the predetermined screen configuration format.

17. A method for synchronously adjusting a screen setting for a multi-screen system supporting a daisy chain tech, the method comprising:

via a first physical link between an electronic device and a first screen of the multi-screen system, writing a first display port configuration interface including a screen setting in a first display port address of the first screen; and via a second physical link between the first screen and a second screen of multi-screen system, writing a second display port configuration interface including the screen setting in a second display port address of the second screen;

wherein the first and second screens read the first and second display port configuration interface mapped to the first and second display port addresses, to adjust screen configurations of the first and second screens according to the first and second display port configuration interface;

wherein the first and second display port configuration interface are read and written via the first and second physical link;

wherein the electronic device is a screen of the multi-screen system.

18. The method of claim 17, wherein the first and second display port configuration interfaces are display data channel/command interfaces, DDC/CI.

* * * * *